United States Patent
Dembkoski

(10) Patent No.: US 11,509,125 B1
(45) Date of Patent: Nov. 22, 2022

(54) ADJUSTABLE IN-GROUND UTILITIES BOX ASSEMBLY

(71) Applicant: Derek Dembkoski, Indian Land, SC (US)

(72) Inventor: Derek Dembkoski, Indian Land, SC (US)

( * ) Notice: Subject to any disclaimer, the term of this patent is extended or adjusted under 35 U.S.C. 154(b) by 148 days.

(21) Appl. No.: 17/208,388

(22) Filed: Mar. 22, 2021

Related U.S. Application Data

(60) Provisional application No. 62/992,593, filed on Mar. 20, 2020.

(51) Int. Cl.
  *H02G 3/08* (2006.01)
  *H02G 9/10* (2006.01)
  *H02G 3/14* (2006.01)

(52) U.S. Cl.
  CPC .............. *H02G 9/10* (2013.01); *H02G 3/083* (2013.01); *H02G 3/086* (2013.01); *H02G 3/14* (2013.01)

(58) Field of Classification Search
  CPC .......... H02G 3/08; H02G 3/081; H02G 3/083; H02G 3/086; H02G 3/14; H02G 9/10; H02G 9/00; H05K 5/00; H05K 5/02; H05K 5/0217; H05K 5/04
  USPC ......... 174/50, 53, 57, 58, 37, 559, 560, 561; 220/3.2–3.9, 4.02; 361/600, 601, 679.01
  See application file for complete search history.

(56) References Cited

U.S. PATENT DOCUMENTS

| | | | | |
|---|---|---|---|---|
| 3,913,400 | A * | 10/1975 | Floren | G01F 15/14 73/431 |
| 3,952,908 | A * | 4/1976 | Carson | H02B 1/06 220/831 |
| 4,872,575 | A * | 10/1989 | Kobilan | H02G 9/10 220/3.3 |
| 6,749,080 | B1 * | 6/2004 | White | E03B 7/095 137/381 |
| 7,030,315 | B1 * | 4/2006 | Dunn | H02G 9/10 174/67 |
| 8,796,548 | B2 * | 8/2014 | Rost | H05K 5/061 174/50 |
| 8,847,070 | B2 * | 9/2014 | Burke | G02B 6/4451 174/37 |
| 9,022,439 | B2 * | 5/2015 | Ousley | H02G 9/10 174/50 |
| 10,804,644 | B2 * | 10/2020 | Cretella | H02G 3/185 |

* cited by examiner

*Primary Examiner* — Angel R Estrada
(74) *Attorney, Agent, or Firm* — Schwartz Law Firm, P.C.

(57) ABSTRACT

An adjustable in-ground box assembly is configured to form a protective enclosure for an in-ground utilities device. The adjustable in-ground box assembly includes an outer box and an inner box. A reinforced vertical interior fastener panel is formed with a wall of the outer box, and includes a number of pre-formed outer box fastener holes arranged in spaced apart vertical columns. The inner box includes a number of inner box fastener holes arranged in a horizontal row. The height of the in-ground box assembly is vertically adjusted by aligning the inner box fastener holes with horizontally-situated outer box fastener holes at a selected height on the vertical fastener panel. The tilt of the in-ground box assembly is adjusted by aligning the inner box fastener holes with selected diagonally-situated outer box fastener holes.

20 Claims, 5 Drawing Sheets

ADJUSTABLE IN-GROUND UTILITIES BOX ASSEMBLY

TECHNICAL FIELD AND BACKGROUND OF THE DISCLOSURE

The present disclosure relates broadly and generally to an adjustable in-ground utilities box assembly. In exemplary embodiments, the present in-ground box assembly creates a protective environmental enclosure for an in-ground water meter used to measure the volume of water supplied by a municipal water supply system to a residential home or other building.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises an adjustable in-ground box assembly configured to form a protective enclosure for an in-ground utilities device. The adjustable in-ground box assembly includes an outer box and an inner box. The outer box has integrally joined walls defining an open top and a bottom. The bottom forms an interior floor of the in-ground box assembly. A reinforced vertical interior fastener panel is formed with a wall of the outer box, and includes a number of pre-formed outer box fastener holes arranged in spaced apart vertical columns. The inner box is located inside the outer box, and has integrally joined walls defining an open bottom and a substantially planar open top. The inner box includes a number of inner box fastener holes arranged in a horizontal row. The height of the in-ground box assembly is vertically adjusted by aligning the inner box fastener holes with horizontally-situated outer box fastener holes at a selected height on the vertical fastener panel. When fastened at the aligned holes, the planar open top of the inner box resides at a selected vertical distance parallel to and above the interior floor of the in-ground box assembly. The tilt of the in-ground box assembly is adjusted by aligning the inner box fastener holes with selected diagonally-situated outer box fastener holes. When fastened at these aligned holes, the planar open top of the inner box tilts relative to the interior floor of the in-ground box assembly. A removable lid selectively closes the planar open top of the inner box proximate a ground level.

As used herein, the term "horizontally-situated" refers to 2 or more fastener holes arranged in a notional line spaced apart and generally parallel to the planar floor of the in-ground box assembly. The term "diagonally-situated" refers to 2 or more fasteners holes arranged in a notional line which extends at an angle relative to the planar floor of the in-ground box assembly.

The term "box" refers broadly and generally herein to a walled structure of any geometric shape and size including (e.g.) rectangular, oval and circular.

The term "planar open top" refers to the top opening defined by top edges of the inner box walls—the top edges residing within a common notional plane.

The term "in-ground utilities device" refers broadly and generally to any in-ground structure, element, part or component applicable in the provision of useful services, such as electricity, gas, water, cable, telephone, and others, to a home or other residential, commercial or industrial building. One example of an in-ground utilities device comprises a water meter designed to measure the volume of water supplied to a building by a public water supply system. Another example of an in-ground utilities device may comprise a supply valve designed to control the flow of water through an in-ground irrigation system.

According to another exemplary embodiment, an outer box flange is formed around a perimeter of the outer box proximate the open top of the outer box.

According to another exemplary embodiment, an inner box flange is formed around a perimeter of the inner box proximate the open top of the inner box.

According to another exemplary embodiment, a resilient compressible gasket is located between the inner box flange and the outer box flange.

According to another exemplary embodiment, the outer box has opposing end walls and opposing side walls.

According to another exemplary embodiment, the end walls of the outer box include respective cut-outs adjacent the floor to enable passage of pipe through the in-ground box assembly.

According to another exemplary embodiment, the opposing end walls of the outer box are angled inwardly from the floor towards the open top.

According to another exemplary embodiment, the opposing side walls of the outer box are angled inwardly from the floor towards the open top. Alternatively, the side walls may be substantially perpendicular to the floor.

According to another exemplary embodiment, the walls of the inner box are substantially perpendicular to the planar open top.

According to another exemplary embodiment, both the open top of the outer box and the open top of the inner box are substantially rectangular.

According to another exemplary embodiment, adjacent outer box fastener holes in each column are vertically spaced apart a distance between 0.5 and 1.5 inches.

In yet another exemplary embodiment, the present disclosure comprises an adjustable in-ground box assembly configured to form a protective enclosure for an in-ground utilities device. The adjustable in-ground box assembly includes an outer box and an inner box. The outer box has integrally joined walls defining an open top and a bottom. The bottom forms an interior floor of the in-ground box assembly. A reinforced vertical interior fastener panel is formed with a wall of the outer box, and includes a number of pre-formed outer box fastener holes arranged in spaced apart vertical columns. The inner box is located inside the outer box, and has integrally joined walls defining an open bottom and a substantially planar open top. Height adjustment means are provided for vertically adjusting the location of the inner box relative to the outer box, such that the planar open top of the inner box resides at a selected vertical distance parallel to and above the interior floor of the in-ground box assembly. Tilt adjustment means are provided for adjusting a tilt of the inner box relative to the outer box, such that the planar open top of the inner box tilts relative to the interior floor of the in-ground box assembly. A removable lid selectively closes the planar open top of the inner box proximate a ground level.

In exemplary embodiments, the "height adjustment means" may comprise removable fasteners and selectively aligned fastener holes, as described further herein, or other structure such as one or multiple sets of cooperating interfering shoulders located on an inside of the outer box and an outside of the inner box, complementary fasteners (e.g., hook and loop) located on an inside of the outer box and an outside of the inner box, complementary vertical rails and channels located on an inside of the outer box and an outside of the inner box, complementary friction-engaging elements located on an inside of the outer box and an outside of the inner box, vertical support bracing engaging the inner box, telescoping vertical support bracing engaging the inner box, one or more support brackets located on an inside of the outer box and engaging the inner box, and other structure equivalent to the foregoing.

In exemplary embodiments, the "tilt adjustment means" may comprise removable fasteners and selectively aligned fastener holes, as described further herein, or other structure such as one or multiple sets of cooperating interfering shoulders located on an inside of the outer box and an outside of the inner box, complementary fasteners (e.g., hook and loop) located on an inside of the outer box and an outside of the inner box, complementary vertical rails and channels located on an inside of the outer box and an outside of the inner box, complementary friction-engaging elements located on an inside of the outer box and an outside of the inner box, vertical support bracing engaging the inner box, telescoping vertical support bracing engaging the inner box, one or more support brackets located on an inside of the outer box and engaging the inner box, and other structure equivalent to the foregoing.

BRIEF DESCRIPTION OF THE DRAWINGS

Exemplary embodiments of the present disclosure will hereinafter be described in conjunction with the following drawing figures, wherein like numerals denote like elements, and wherein.

DESCRIPTION OF EXEMPLARY
EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
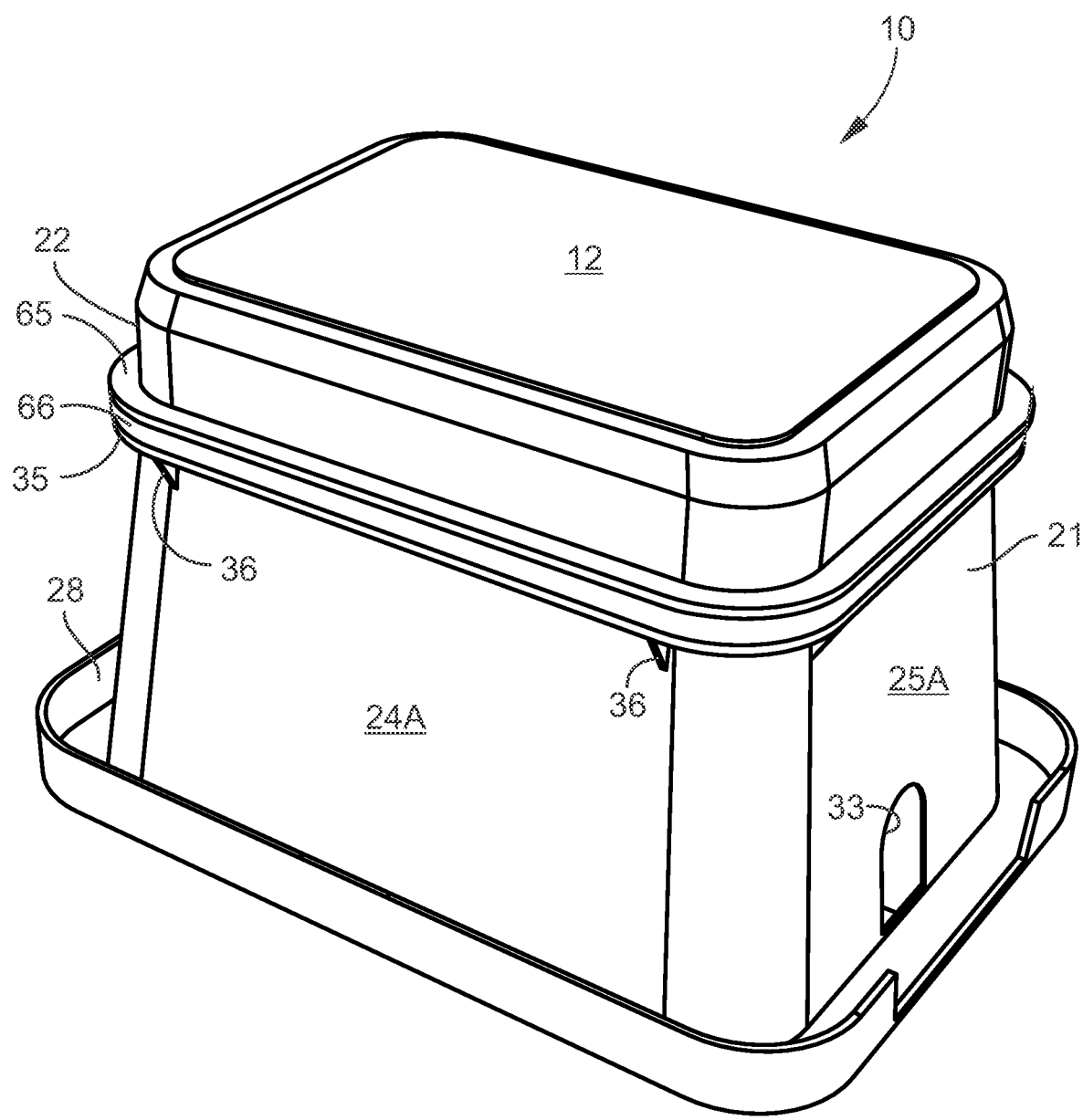
FIG. 1 is a perspective view of the adjustable in-ground utilities box assembly according to one exemplary embodiment of the present disclosure.
Figure 2:
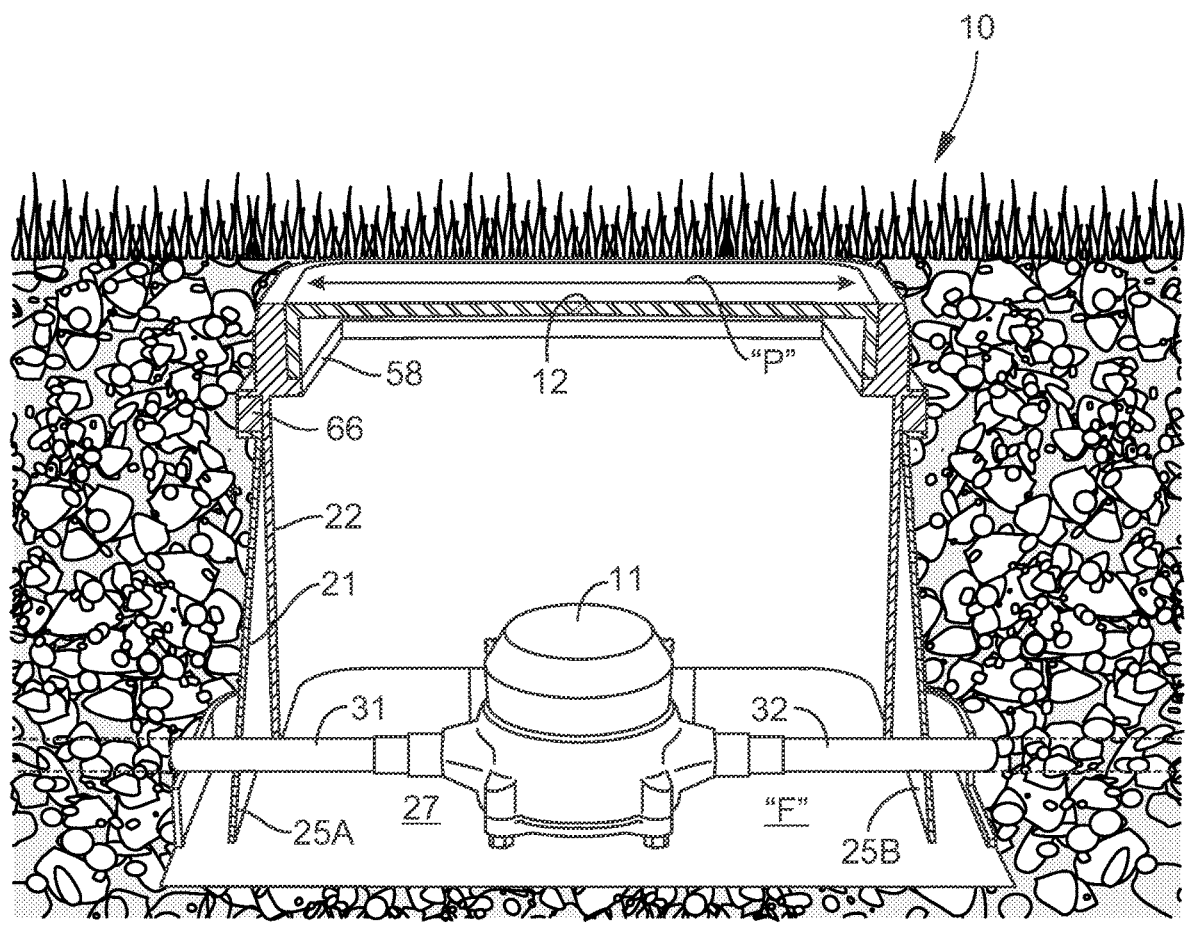
FIG. 2 is an environmental view of the exemplary in-ground box assembly with portions shown in cross-section to illustrate the in-ground utilities device within the protective enclosure.

Referring now specifically to the drawings, an adjustable in-ground utilities box assembly according to one exemplary embodiment of the present disclosure is illustrated in FIGS. 1 and 2 and shown generally at broad reference numeral 10. The in-ground box assembly 10 creates a protective environmental enclosure for an in-ground utilities device, such as a conventional water meter 11. Such meters are commonly used to measure the volume of water supplied by a municipal water supply system to a home through connected lines. A removable lid 12 allows access to an interior of the enclosure in order to read the water meter 11 and to manually open/close a main water shut-off valve (not shown) to the home. As represented in FIG. 2, the in-ground box assembly 10 is placed into the ground at an estimated depth prior to installing the water meter 11. After final land grading, the exemplary in-ground box assembly 10 can be readily adjusted as described below such that the removable lid 12 properly resides proximate a ground level. In exemplary embodiments, the in-ground box assembly 10 is manufactured of a high impact, high-density, injection molded, structural foam polyethylene or other suitable material.

Figure 3:
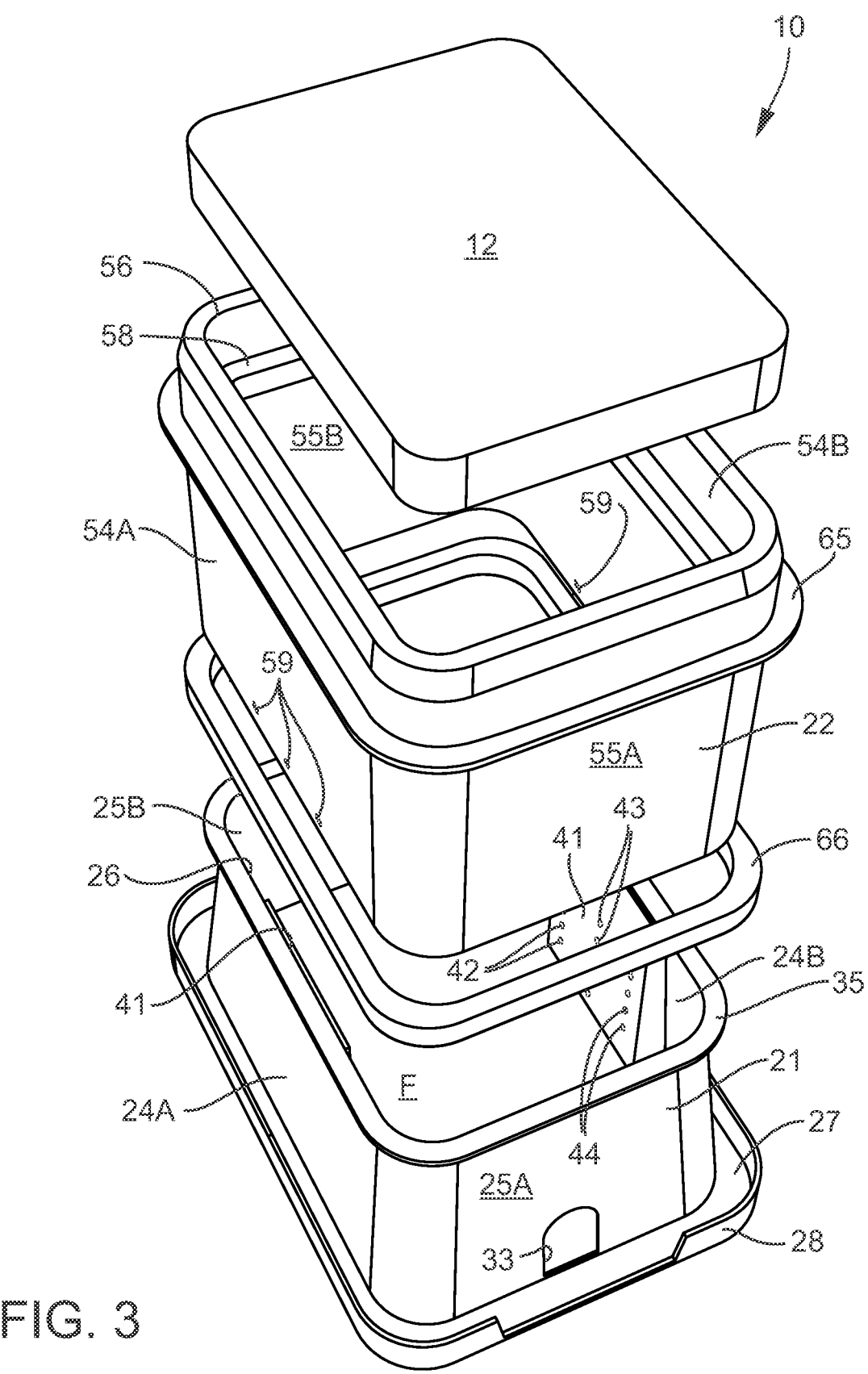
FIG. 3 is an exploded perspective view of the in-ground box assembly.

As shown in FIGS. 1, 2 and 3, the present in-ground box assembly 10 includes an outer box 21 and an inner box 22. The outer box 21 has integrally joined side walls 24A, 24B and end walls 25A, 25B defining an open top 26 and a bottom 27. The bottom 27 forms an interior floor "F" of the protective enclosure. The bottom 27 extends beyond the interior of the enclosure and comprises an upward extending strength-reinforcing perimeter lip 28 surrounding the joined walls 24A, 24B, 25A, 25B. The water meter 11 sits inside the enclosure adjacent the floor "F" and operatively connects to the municipal supply line 31 and homeowner supply line 32. The water lines 31, 32 extend through aligned cutouts 33, 34 in respective end walls 25A, 25B of the outer box 21. The ends walls 25A, 25B of the outer box 21 are formed (e.g., molded) with the bottom 27 and angle inwardly towards the open top 26. The side walls 24A, 24B are likewise formed with the bottom 27 and may also angle inwardly towards the open top 26; or alternatively, may extend substantially perpendicular to the bottom 27 towards the open top 26. An outward-extending molded flange 35 is located at the open top 26 and extends continuously around a top perimeter of the outer box 21. Spaced apart gusset supports 36 may be located between the flange 35 and walls of the outer box 21 for strength reinforcement. In exemplary embodiments, both the open top 26 and bottom 27 of the outer box 21 are substantially rectangular.

As best shown in FIG. 3, a reinforced vertical interior fastener panel 41 is formed with each side wall 24A, 24B of the outer box 21, and includes a number of pre-formed outer box fastener holes 42, 43, 44 arranged in respective spaced apart vertical columns. In an exemplary embodiment, each column has 3-5 vertically aligned holes 42, 43, 44 spaced apart a distance between 0.5 and 1.5 inches. The fastener panel 41 may comprise a solid vertically tapered area of increased material thickness ranging of 0.5 to 3.0 inches. Identical fastener panels 41 with outer box fastener holes "H" may be formed in each side wall 24A, 24B of the outer box 21.

The inner box 22 is located inside the outer box 21, and has integrally joined opposing side walls 54A, 54B and opposing end walls 55A, 55B—collectively forming a substantially planar open top 56 and an open bottom 57. The removable lid 12 sits atop an interior shoulder 58 of the inner box 22 and is countersunk at the open top 56. The walls 54A, 54B, 55A, 55B of the inner box 22 are substantially perpendicular to the planar open top 56, and define substantially rectangular top and bottom openings. The open top 56 of the inner box 22 is defined by top edges of the box walls 54A, 54B, 55A, 55B, each top edge residing within a common notional plane represented by line "P" in FIG. 2. The inner box 22 includes a number of spaced apart inner box fastener holes 59 arranged in a single horizontal row located proximate a bottom of each opposing side wall 54A, 54B and operatively aligned with respective columns of fastener holes 42, 43, 44 formed with the outer box 21. A continuous outward-extending inner box flange 65 is formed around a perimeter of the inner box 22 proximate the open top 56.

In one exemplary embodiment, a resilient compressible gasket 66 is located between the outer box flange 35 and the inner box flange 65, and is configured to closely frictionally engage the walls 54A, 54B, 55A, 55B of the inner box 22. The gasket 66 may function to absorb downward pressure caused by heavy machinery driving over the in-ground box assembly 10 during construction, thereby preventing damage to the inner and/or outer boxes 21, 22. The gasket 66 may also substantially seal the in-ground box assembly 10 when the top box 22 is adjusted as described below, thereby restricting entry of water and dirt inside the protective enclosure.

Figure 4:
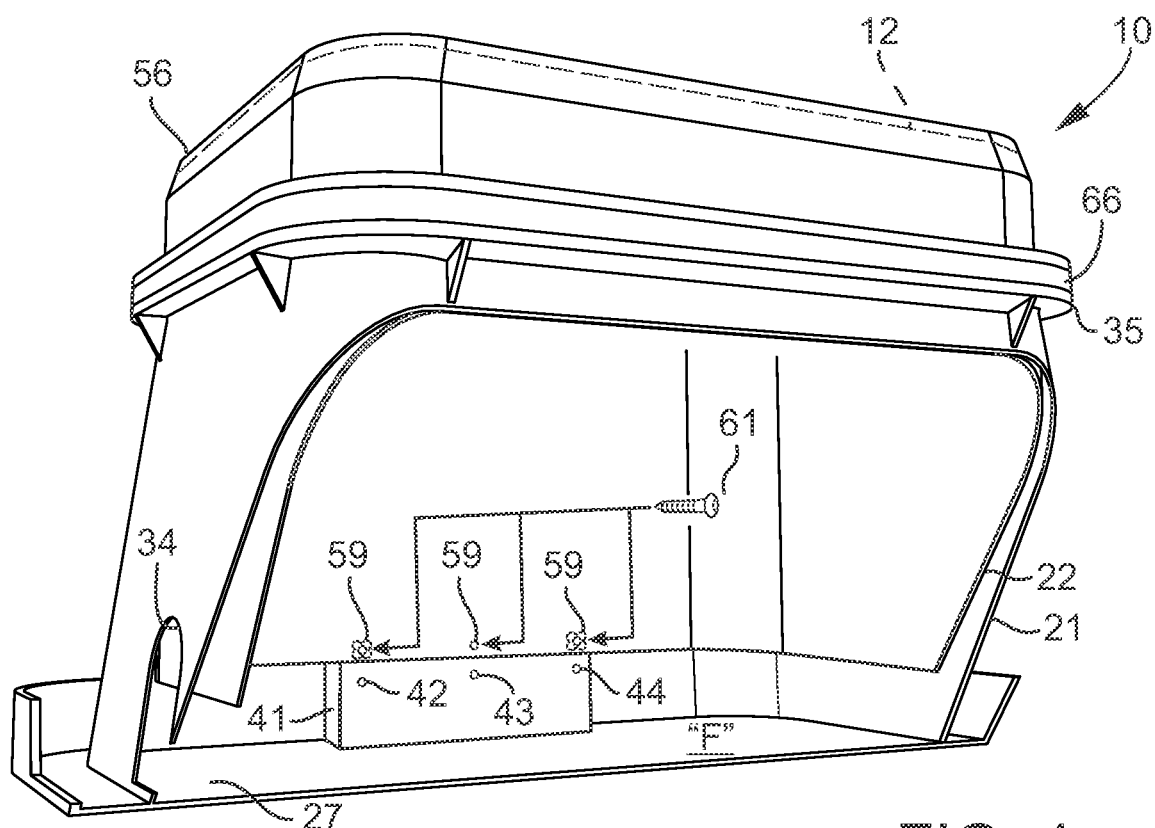
FIGS. 4 and 5 are views demonstrating height adjustment of the in-ground box assembly.
Figure 5:
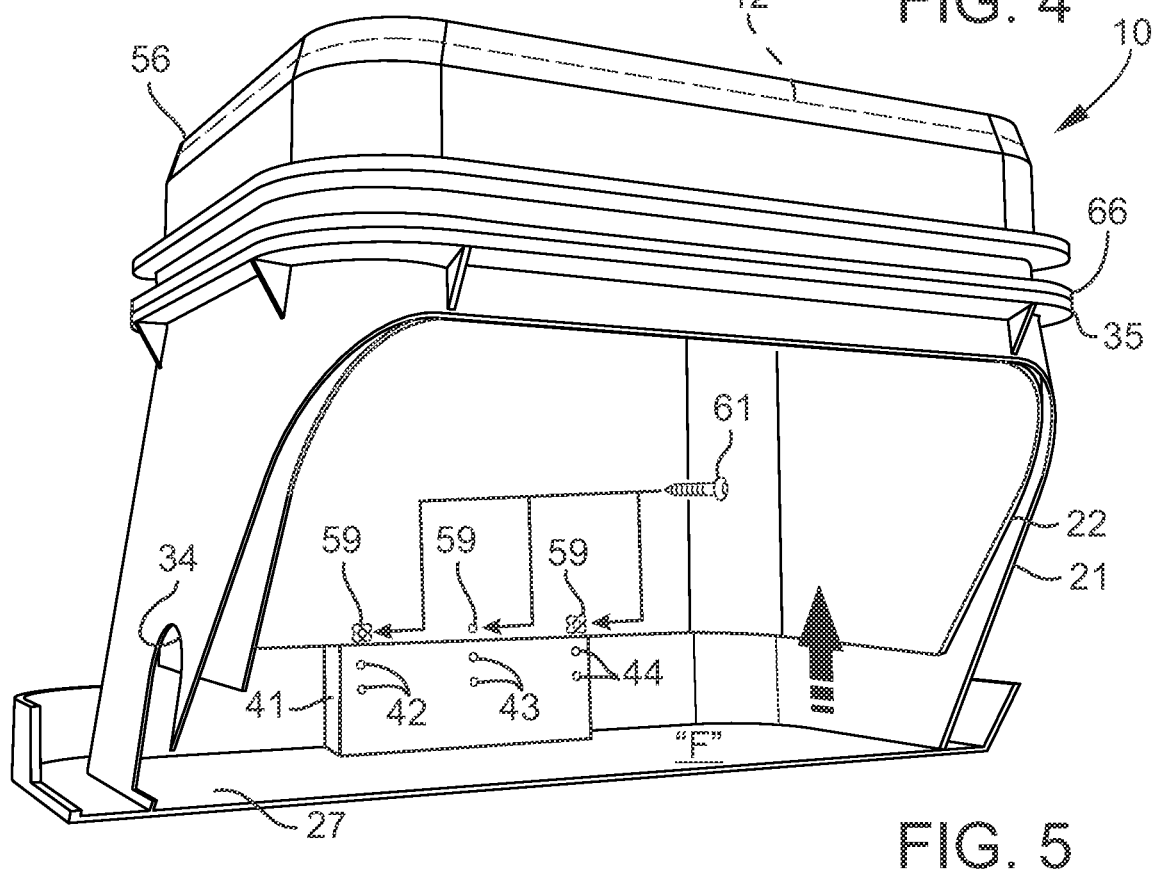

FIGS. 4 and 5 demonstrate height adjustment of the exemplary in-ground box assembly 10. After final grading, the height of the in-ground box assembly 10 is vertically adjusted by aligning the inner box fastener holes 59 with horizontally-situated outer box fastener holes 42, 43, 44 at a selected height on the reinforced vertical fastener panel 41. When fastened at the aligned holes via screws 61 or the like, the planar open top 56 of the inner box 22 resides at a selected vertical distance parallel to and above the interior floor "F" (bottom 27 of outer box 21) of the in-ground box assembly 10. The gasket 66 remains positioned atop the outer box flange 35 and frictionally engages the inner box 22, as previously described. The removable countersunk lid 12 is placed at the otherwise open top 56 proximate ground level to close access to an interior of the protective enclosure.

Figure 6:
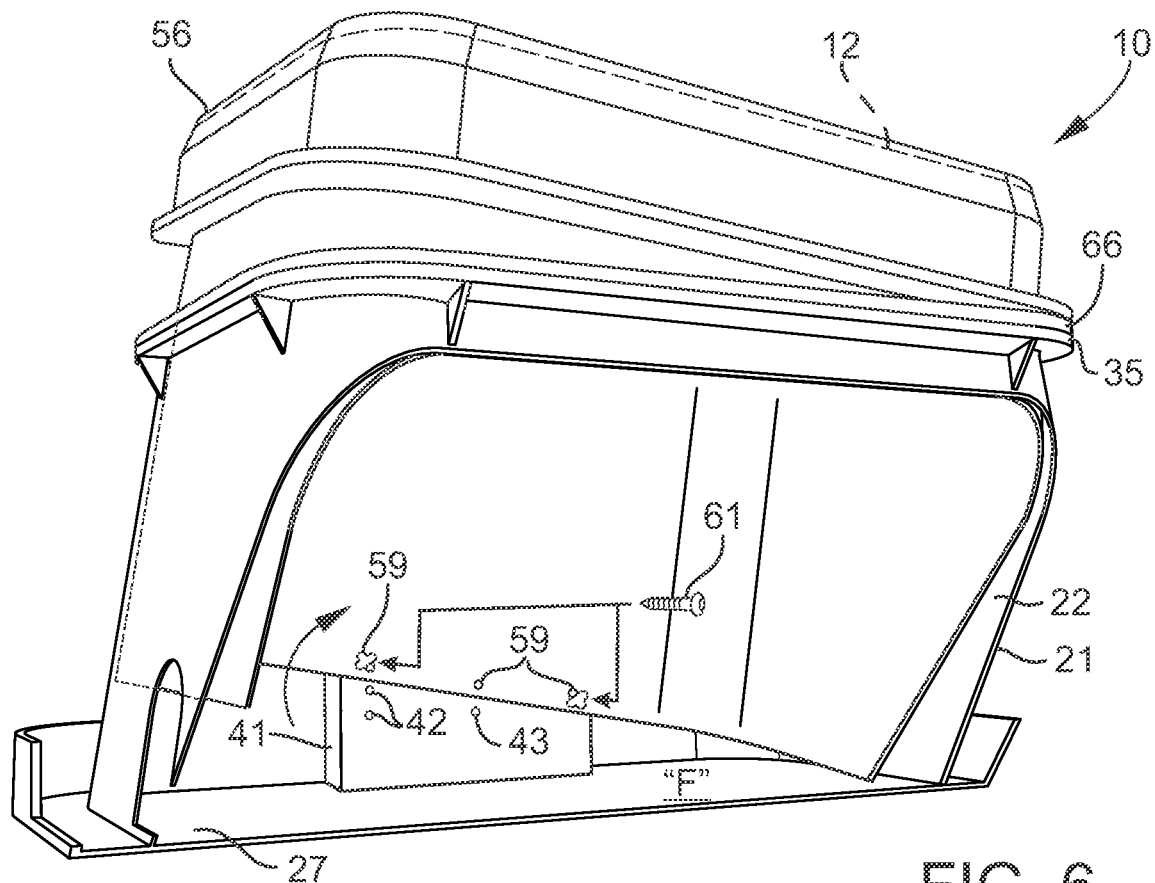
FIGS. 6 and 7 are views demonstrating tilt adjustment of the in-ground box assembly.
Figure 7:
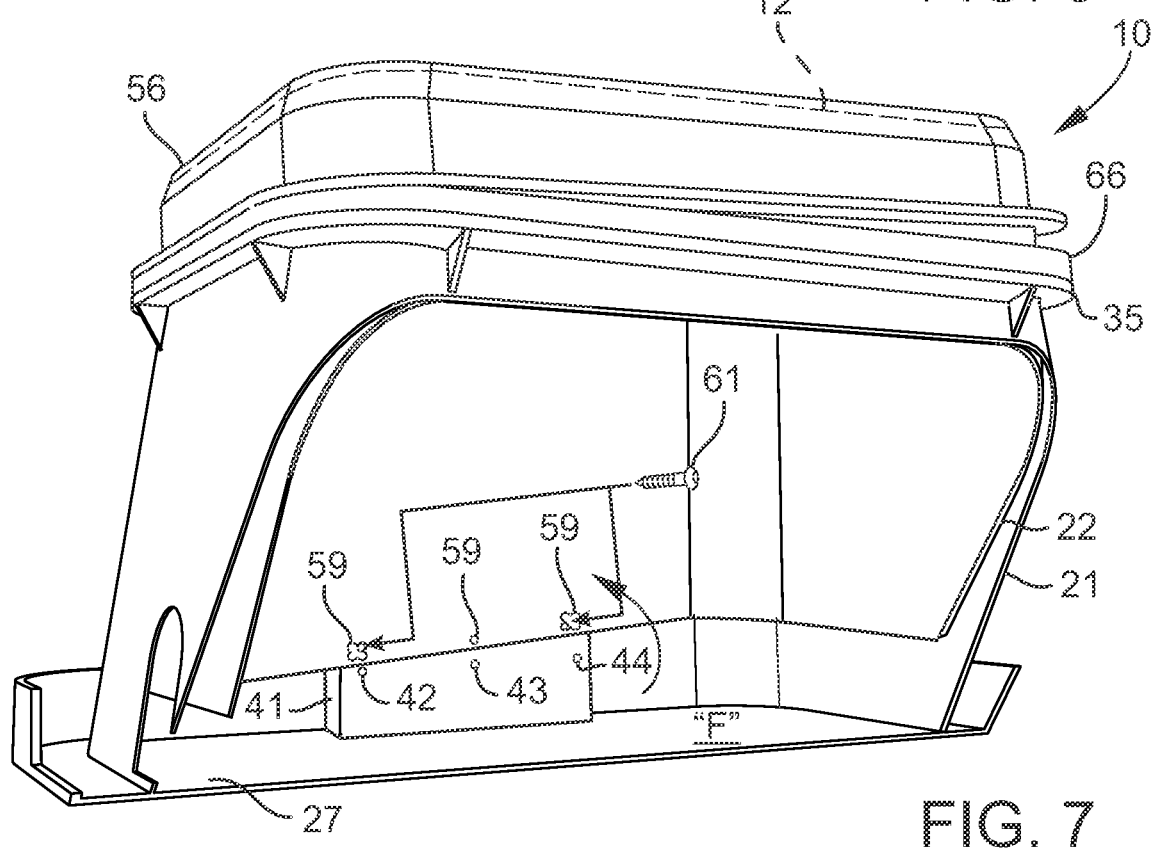

FIGS. 6 and 7 demonstrate tilt adjustment of the exemplary in-ground box assembly 10. After final grading, the tilt of the in-ground box assembly 10 is adjusted by aligning the inner box fastener holes 59 with selected diagonally-situated outer box fastener holes 42, 44. To enable proper alignment with holes 42, 44 of the outer box 21, the outside fastener holes 59 of the inner box 22 may comprises generally X-shaped slots—or "X slots". When fastened at these aligned holes, the planar open top 56 of the inner box 22 tilts relative to the interior floor "F" (bottom 27 of outer box 21) of the in-ground box assembly 10 to substantially align with a sloping grade. The removable countersunk lid 12 selectively closes the otherwise open top 56 proximate the ground level.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under 35 U.S.C. § 112(f)

[or 6th paragraph/pre-AIA] is not intended. Additionally, it is not intended that the scope of patent protection afforded the present invention be defined by reading into any claim a limitation found herein that does not explicitly appear in the claim itself.

What is claimed:

1. An adjustable in-ground box assembly configured to form a protective enclosure for an in-ground utilities device, said adjustable in-ground box assembly comprising:
   an outer box having integrally joined walls defining an open top and a bottom, said bottom forming an interior floor of said in-ground box assembly;
   a reinforced vertical interior fastener panel formed with a wall of said outer box, and comprising a plurality of pre-formed outer box fastener holes arranged in spaced apart vertical columns;
   an inner box located inside said outer box, and having integrally joined walls defining an open bottom and a substantially planar open top, and said inner box comprising a plurality of inner box fastener holes arranged in a horizontal row, whereby:
   (i) the height of said in-ground box assembly is vertically adjusted by aligning the inner box fastener holes with horizontally-situated outer box fastener holes at a selected height on said vertical fastener panel, such that when fastened at the aligned holes, the planar open top of said inner box resides at a selected vertical distance parallel to and above the interior floor of said in-ground box assembly; and
   (ii) the tilt of said in-ground box assembly is adjusted by aligning the inner box fastener holes with selected diagonally-situated outer box fastener holes, such that when fastened at the aligned holes, the planar open top of said inner box tilts relative to the interior floor of said in-ground box assembly; and
   a removable lid for selectively closing the planar open top of said inner box proximate a ground level.

2. The adjustable in-ground box assembly according to claim 1, and comprising an outer box flange formed around a perimeter of said outer box proximate the open top of said outer box.

3. The adjustable in-ground box assembly according to claim 2, and comprising an inner box flange formed around a perimeter of said inner box proximate the open top of said inner box.

4. The adjustable in-ground box assembly according to claim 3, and comprising a resilient compressible gasket located between said inner box flange and said outer box flange.

5. The adjustable in-ground box assembly according to claim 1, wherein said outer box comprises opposing end walls and opposing side walls.

6. The adjustable in-ground box assembly according to claim 5, wherein the end walls of said outer box comprise respective cut-outs adjacent the floor to enable passage of pipe through said in-ground box assembly.

7. The adjustable in-ground box assembly according to claim 5, wherein the opposing end walls of said outer box are angled inwardly from said floor towards the open top.

8. The adjustable in-ground box assembly according to claim 7, wherein the opposing side walls of said outer box are angled inwardly from said floor towards the open top.

9. The adjustable in-ground box assembly according to claim 1, wherein the walls of said inner box are substantially perpendicular to said planar open top.

10. The adjustable in-ground box assembly according to claim 1, wherein both the open top of said outer box and the open top of said inner box are substantially rectangular.

11. The adjustable in-ground box assembly according to claim 1, wherein adjacent outer box fastener holes in each column are vertically spaced apart a distance between 0.5 and 1.5 inches.

12. An adjustable in-ground box assembly configured to form a protective enclosure for an in-ground utilities device, said adjustable in-ground box assembly comprising:
   an outer box having integrally joined walls defining an open top and a bottom, said bottom forming an interior floor of said in-ground box assembly;
   a reinforced vertical interior fastener panel formed with a wall of said outer box, and comprising a plurality of pre-formed outer box fastener holes arranged in spaced apart vertical columns;
   an inner box located inside said outer box, and having integrally joined walls defining an open bottom and a substantially planar open top;
   means for vertically adjusting the location of said inner box relative to said outer box, such that the planar open top of said inner box resides at a selected vertical distance parallel to and above the interior floor of said in-ground box assembly;
   means for adjusting a tilt of said inner box relative to said outer box, such that the planar open top of said inner box tilts relative to the interior floor of said in-ground box assembly; and
   a removable lid for selectively closing the planar open top of said inner box proximate a ground level.

13. The adjustable in-ground box assembly according to claim 12, and comprising an outer box flange formed around a perimeter of said outer box proximate the open top of said outer box.

14. The adjustable in-ground box assembly according to claim 13, and comprising an inner box flange formed around a perimeter of said inner box proximate the open top of said inner box.

15. The adjustable in-ground box assembly according to claim 14, and comprising a resilient compressible gasket located between said inner box flange and said outer box flange.

16. The adjustable in-ground box assembly according to claim 12, wherein said outer box comprises opposing end walls and opposing side walls.

17. The adjustable in-ground box assembly according to claim 16, wherein the end walls of said outer box comprise respective cut-outs adjacent the floor to enable passage of pipe through said in-ground box assembly.

18. The adjustable in-ground box assembly according to claim 16, wherein the opposing end walls of said outer box are angled inwardly from said floor towards the open top.

19. The adjustable in-ground box assembly according to claim 12, wherein the walls of said inner box are substantially perpendicular to said planar open top.

20. The adjustable in-ground box assembly according to claim 12, wherein both the open top of said outer box and the open top of said inner box are substantially rectangular.

* * * * *